US012099849B2

(12) United States Patent
Liu et al.

(10) Patent No.: US 12,099,849 B2
(45) Date of Patent: Sep. 24, 2024

(54) BIOS CONFIGURATIONS VIA PROVISIONING DEVICES

(71) Applicant: Hewlett-Packard Development Company, L.P., Spring, TX (US)

(72) Inventors: Wei Ze Liu, Spring, TX (US); Lan Wang, Spring, TX (US); Chengkai Yeh, Spring, TX (US); Christian Pena, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 8 days.

(21) Appl. No.: 17/996,555

(22) PCT Filed: May 29, 2020

(86) PCT No.: PCT/US2020/035123
§ 371 (c)(1),
(2) Date: Oct. 19, 2022

(87) PCT Pub. No.: WO2021/242252
PCT Pub. Date: Dec. 2, 2021

(65) Prior Publication Data
US 2023/0205545 A1 Jun. 29, 2023

(51) Int. Cl.
*G06F 9/4401* (2018.01)
(52) U.S. Cl.
CPC .................. *G06F 9/4401* (2013.01)
(58) Field of Classification Search
CPC ... G06F 9/4401; G06F 9/44505; G06F 21/572
See application file for complete search history.

(56) References Cited

U.S. PATENT DOCUMENTS

| 4,400,798 | A  | * | 8/1983  | Francis ..................... G06F 8/66 |
|           |    |   |         | 365/174 |
| 6,760,752 | B1 | * | 7/2004  | Liu ....................... H04L 63/0435 |
| 7,827,394 | B2 |   | 11/2010 | Brown et al. |
| 8,838,948 | B2 |   | 9/2014  | Harmer |
| 9,128,729 | B1 |   | 9/2015  | Hung et al. |
| 9,182,998 | B2 |   | 11/2015 | Inbaraj |
| 10,219,135 | B1 | * | 2/2019 | Yau ......................... H04W 4/80 |
| 10,580,284 | B2 | * | 3/2020 | Ramaci ................. A61J 7/0481 |
| 2003/0115444 | A1 | * | 6/2003 | Yang ..................... G06F 9/4403 |
|              |    |   |        | 714/E11.133 |
| 2004/0006690 | A1 | * | 1/2004 | Du .......................... G06F 9/441 |
|              |    |   |        | 713/2 |
| 2005/0160272 | A1 |   | 7/2005 | Teppler |
| 2006/0123220 | A1 | * | 6/2006 | Colson .................... G10L 15/28 |
|              |    |   |        | 713/1 |
| 2008/0256351 | A1 |   | 10/2008 | Natarajan |

(Continued)

FOREIGN PATENT DOCUMENTS

EP      2993579 A1    3/2016

*Primary Examiner* — Faisal M Zaman
(74) *Attorney, Agent, or Firm* — Knobbe, Martens, Olson & Bear, LLP (57) ABSTRACT

An example computing device includes a non-volatile memory to store Basic Input/Output Systems (BIOS) data of the computing device, an audio codec, and a controller. The controller is to: receive a command from a provisioning device at the audio codec; and transfer a copy of the BIOS data between the controller and the memory based on the command.

12 Claims, 7 Drawing Sheets

(56) References Cited

U.S. PATENT DOCUMENTS

| | | | |
|---|---|---|---|
| 2009/0300343 A1 | 12/2009 | Lan et al. | |
| 2010/0332830 A1* | 12/2010 | Shon | H04L 9/3273 |
| | | | 713/168 |
| 2012/0023598 A1 | 1/2012 | Mulcahy | |
| 2013/0198504 A1 | 8/2013 | Arnold et al. | |
| 2016/0043864 A1 | 2/2016 | Fedronic et al. | |
| 2016/0055113 A1* | 2/2016 | Hodge | G06F 13/4027 |
| | | | 710/308 |
| 2017/0053111 A1* | 2/2017 | Stewart | G06F 9/4406 |
| 2017/0131753 A1 | 5/2017 | Ahmed et al. | |
| 2017/0249155 A1* | 8/2017 | Sundrani | G11C 11/005 |
| 2018/0084996 A1* | 3/2018 | Su | A61B 3/14 |
| 2019/0243635 A1* | 8/2019 | Van Sickle | G06F 8/654 |
| 2020/0169425 A1* | 5/2020 | Hofstee | H04L 9/0861 |
| 2021/0096621 A1* | 4/2021 | Agrawal | G06F 11/1004 |

* cited by examiner

BIOS CONFIGURATIONS VIA PROVISIONING DEVICES

BACKGROUND

A computing device, such as a laptop computer, may include a basic input/output system (BIOS) to perform hardware initialization during boot up of the computing device. The BIOS may also provide runtime services for operating system of the computing device.

BRIEF DESCRIPTION OF THE DRAWINGS

Some examples of the present application are described with respect to the following figures.

DETAILED DESCRIPTION

To manage a BIOS of a computing device, a user may access a BIOS Graphical User Interface (GUI), where the user may configure different options associated with the BIOS. During the boot up process of the computing device, the user may be able to access the BIOS GUI by pressing a hotkey (e.g., the F10 key). However, when an operating system of the computing device is loaded, the user may not be able to access the BIOS GUI. Thus, the computing device may be re-booted so that the user may access the BIOS GUI to make changes to the BIOS. In situations where the BIOS is corrupted, the computing device may not be able to even boot. Thus, the user may not be able to access the BIOS GUI at all.

Examples described herein provide an approach to configure a BIOS and/or manage BIOS data of a computing device via a provisioning device. In an example, a computing device may include a non-volatile memory to store Basic Input/Output Systems (BIOS) data of the computing device. The computing device may also include an audio codec and a controller. The controller may receive a command from a provisioning device at the audio codec and transfer a copy of the BIOS data between the controller and the memory based on the command.

In another example, a computing device may include a Basic Input/Output System (BIOS). The computing device may also include a controller to receive a boot command from a provisioning device as an acoustic signal; configure the BIOS using a BIOS profile that is associated with the boot command; and turn on the computing device in response to receiving the boot command.

In another example, a non-transitory computer-readable storage medium may include instructions that when executed cause a controller of a computing device to: configure a Basic Input/Output System (BIOS) of the computing device based on a first BIOS profile in response to receiving a first power up command from a power button of the computing device; and configure the BIOS based on a second BIOS profile in response to receiving a boot command from a provisioning device via a wireless channel, where the boot command may include a second power up command and a profile identifier associated with the second BIOS profile. Thus, examples described herein may provide an additional mechanism to manage a BIOS of a computing device besides the BIOS GUI.

As used herein, As used herein, a basic input/output system (BIOS) refers to hardware or hardware and instructions to initialize, control, or operate a computing device prior to execution of an operating system (OS) of the computing device. Instructions included within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, or operate components such as hardware components of a computing device and may load or boot the OS of computing device.

In some examples, a BIOS may provide or establish an interface between hardware devices or platform firmware of the computing device and an OS of the computing device, via which the OS of the computing device may control or operate hardware devices or platform firmware of the computing device. In some examples, a BIOS may implement the Unified Extensible Firmware Interface (UEFI) specification or another specification or standard for initializing, controlling, or operating a computing device.

Figure 1:
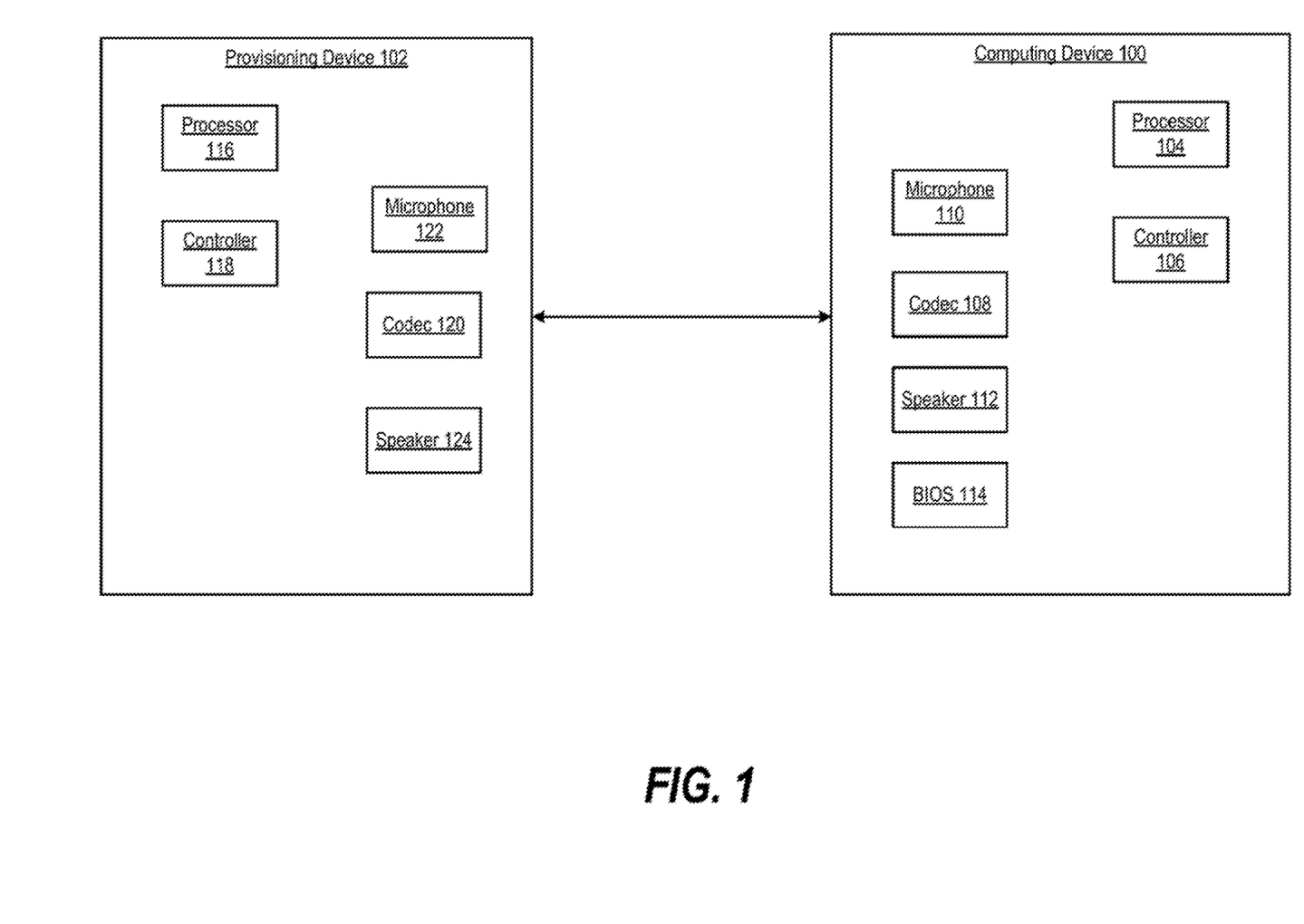
FIG. 1 illustrates a computing device to manage a copy of BIOS data based on a command from a provisioning device, according to an example.

FIG. 1 illustrates a computing device 100 to manage a copy of BIOS data based on a command from a provisioning device 102, according to an example. Computing device 100 may be, a laptop computer, a desktop computer, an all-in-one system, a tablet computing device, or a mobile phone.

Computing device 100 may include a processor 104, a controller 106, a codec 108, a microphone 110, a speaker 112, and a BIOS 114. Processor 104 may be a central processing unit (CPU), a semiconductor-based microprocessor, and/or other hardware devices suitable for retrieval and execution of instructions stored in a computer-readable storage medium. Processor 104 may control operations of computing device 100. Controller 106 may be a semiconductor-microprocessor, an embedded controller, and/or other hardware devices suitable for retrieval and execution of instructions stored in a computer-readable storage medium. Controller 106 may be connected to processor 104 to exchange data. Controller 106 may be also connected to codec 108. Codec 108 may be an audio codec. Codec 108 may be connected to microphone 110 and speaker 112. Codec 108 may encode data generated by controller 106 as sound wave for transmission via speaker 112 and decode sound wave received at microphone 110 to data for processing by controller 106. Codec 108 may be implemented using hardware (e.g., circuitry, field-programmable gate array, microcontroller, etc.), computer executable instructions, or a combination thereof.

Provisioning device 102 may be similar to computing device 100. In some examples, provisioning device 102 may be implemented as a mobile phone. Provisioning device 102 may include a processor 116, a controller 118, a codec 120, a microphone 122, and a speaker 124. Processor 116 may be similar to processor 104. Controller 118 may be similar to controller 106. Codec 120 may be similar to codec 108.

During operation, computing device 100 may exchange data with provisioning device 102 using a data-over-sound scheme. Provisioning device 102 may transmit different commands as acoustic signals to computing device 100 to manage BIOS 114. Managing BIOS 114 via a command from provisioning device 102 is described in more detail in FIGS. 2-4.

Figure 2:
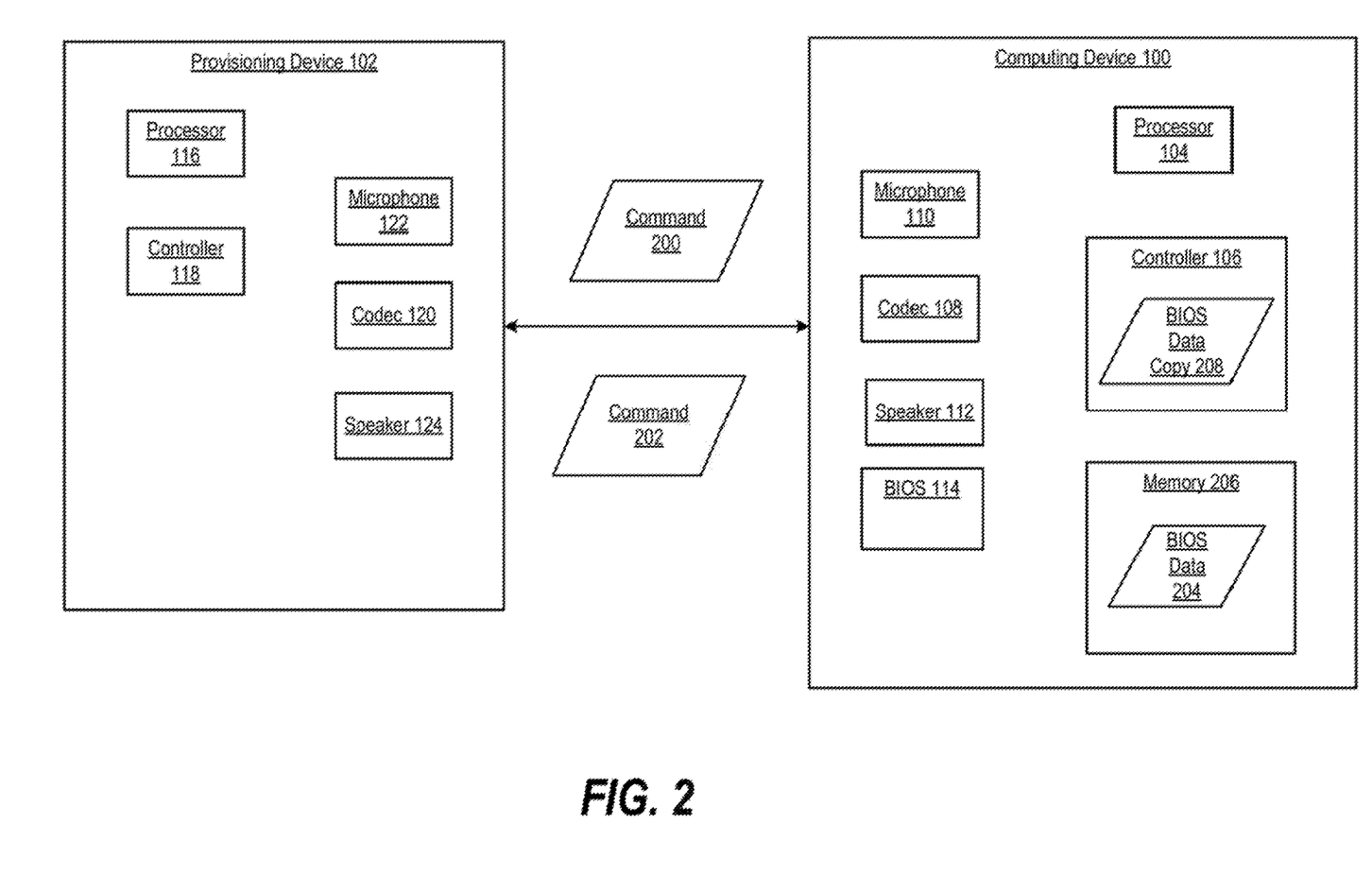
FIG. 2 illustrates a computing device to manage a copy of BIOS data based on a command from a provisioning device, according to another example.

FIG. 2 illustrates computing device 100 to manage a copy of BIOS data based on a command from provisioning device 102, according to another example. In an example, provisioning device 102 may manage BIOS data 204 of BIOS 114 via a command. BIOS data 204 may be any data in BIOS 114. Some examples of BIOS data 204 may include data associated with a setting of BIOS 114, data associated with an encryption key stored in BIOS 114, data associated with a hardware component of computing device 100 (e.g., a keyboard), etc. In some examples, BIOS data 204 may be implemented as UEFI variables. Each UEFI variable may be a unique kind of BIOS data 204. As example, BIOS data 114 may be implemented as a UEFI variable called ConsoleIn-Handle, the ConsoleInHandle variable is associated with active console input device of computing device 100 (e.g., a keyboard). Computing device 100 may include a memory 206 to store BIOS data 204. In some examples, memory 206 may be a non-volatile memory, such as a solid state memory. BIOS 114 may have access to memory 206 to update BIOS data 204.

During operation, provisioning device 102 may transmit a first command 200 to computing device 100 using a data-over-voice scheme. Controller 118 may generate first command 200 and transmit first command 200 to codec 120 for processing. Codec 120 may convert first command 200 from a digital signal to an acoustic signal and transmit first command (as an acoustic signal) using speaker 124 over air.

Computing device 100 may receive the acoustic signal at microphone 110. Codec 108 may convert first command 200 from the acoustic signal back to a digital signal. Controller 106 may process first command 200 to manage BIOS data 204. In some examples, in response to receiving first command 200, controller 106 may back up BIOS data 204 in BIOS 114 by making a copy of BIOS data 204 as BIOS data copy 208 and storing BIOS data copy 208 in controller 106. Provisioning device 102 may cause BIOS data copy 208 to be generated while computing device 100 is functioning properly. Thus, BIOS data copy 208 may be a copy of BIOS data 204 in known working state.

In another example, provisioning device 102 may replace BIOS data 204 using BIOS data copy 208 using a second command 202. When BIOS data 204 is corrupted, BIOS data copy 208 may be used to restore computing device 100 to a working state. Provisioning device 102 may transmit second command 202 to computing device 100 as an acoustic signal as described above.

In response to receiving second command 202 at codec 108, controller 106 may transfer BIOS data copy 208 to BIOS 114 to replace BIOS data 204. For example, BIOS data 204 may be stored in a first memory (not shown) and controller 106 may store a copy of BIOS data copy 208 in the first memory, thus replacing BIOS data 204 with BIOS data copy 208.

In some examples, controller 106, codec 108, microphone 110, and speaker 112 may be connected to a dedicated power source (not shown), such as a battery, so that controller 106 may manage BIOS 114 based on a command from provisioning device 102 even if computing device 100 is not powered on. When computing device 100 is powered on, controller 106, codec 108, microphone 110, and speaker 112 may be powered using a shared power source, such as another battery that provides power to all components of computing device 100 or a power supply.

In some examples, instead of using a data-over-voice scheme to exchange data, other wireless communication protocols may be used. For example, Bluetooth® may be used. As another example, Wi-Fi® may be used. Provisioning device 102 and computing device 100 may replace the respective codec, microphone, and speaker with a wireless communication module that implements the communication protocol.

Figure 3:
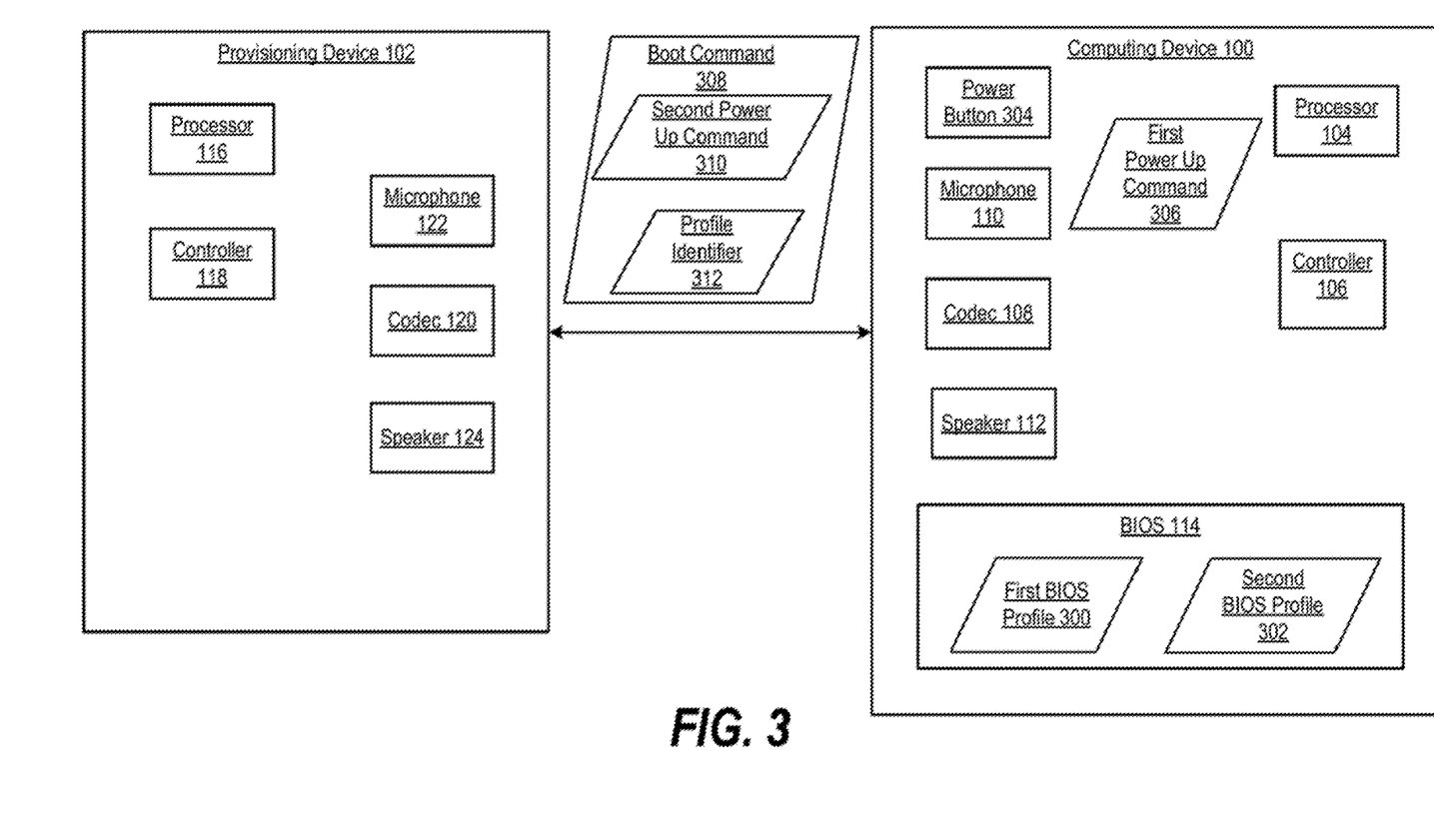
FIG. 3 illustrates a computing device to configure a BIOS based on a command from a provisioning device, according to an example.

FIG. 3 illustrates computing device 100 to configure BIOS 114 based on a command from provisioning device 102, according to an example. As illustrated in FIG. 3, computing device 100 may include a plurality of BIOS profiles, such as a first BIOS profile 300 and a second BIOS profile 302. The plurality of BIOS profiles may be stored in BIOS 114 or in other memory of computing device 100, such as non-volatile memory 206. Computing device 100 may use the plurality of BIOS profiles to quickly change/configure a setting of BIOS 114. For example, first BIOS profile 300 may be a default profile and first BIOS profile 300 may indicate that a setting of BIOS 114 is enabled (e.g., Ethernet port is enabled). Second BIOS profile 302 may indicate that the setting is disabled (e.g., Ethernet port is disabled).

Controller 106 may configure BIOS 114 using a particular BIOS profile so that specific settings are applied once BIOS 114 is executing. Controller 106 may select the particular BIOS profile based on the origin of a power up command. A power up command may be a signal that causes computing device 100 to turn on. Controller 106 may configure BIOS 114 using first BIOS profile 300 when the original of the power up command is from a power button 304 of computing device 100. Controller 106 may configure BIOS 114 using second BIOS profile 302 when the origin of the power up command is provisioning device 102.

During operation, controller 106 may monitor power button 304. When a user presses power button 304, controller 106 may detect the press and interpret press of power button 304 as a first power up command 306. In some examples, when power button 304 is pressed, a power management circuit (not shown) may generate first power up command 306 and controller 106 may detect first power up command 306 from the power management circuit. In response to detecting first power up command 306, controller 106 may configure BIOS 114 to apply setting(s) in first BIOS profile 300. In some examples, first BIOS profile 300 may correspond to a default BIOS profile, where BIOS 114 is configured to have commonly used or frequently used settings. Computing device 100 may turn on in response to detecting first power up command 306.

To use another BIOS profile besides the default BIOS profile, provisioning device 102 may transmit a boot command 306 to computing device 100. Boot command 308 may include a second power up command 310 and a profile identifier 312. Profile identifier 312 may be information that indicates which BIOS profile is to be used.

Codec 108 may receive boot up command 308 at microphone 110. Codec 108 may convert boot up command 308 from an acoustic signal to a digital signal for processing. Controller 106 may receive boot up command 308 from codec 108. Controller 106 may configure BIOS 114 using a BIOS profile as indicated by profile identifier 312. For example, profile identifier 312 may identify second BIOS profile 302 is to be used. Thus, controller 106 may configure BIOS 114 using second BIOS profile 302. Controller 106 may also cause computing device 100 to turn on based on second power up command 310. For example, controller 106 may connect a power source (e.g., a power supply) to power rails of computing device 100 based on second power up command 306 so that computing device 100 turns on.

Figure 4:
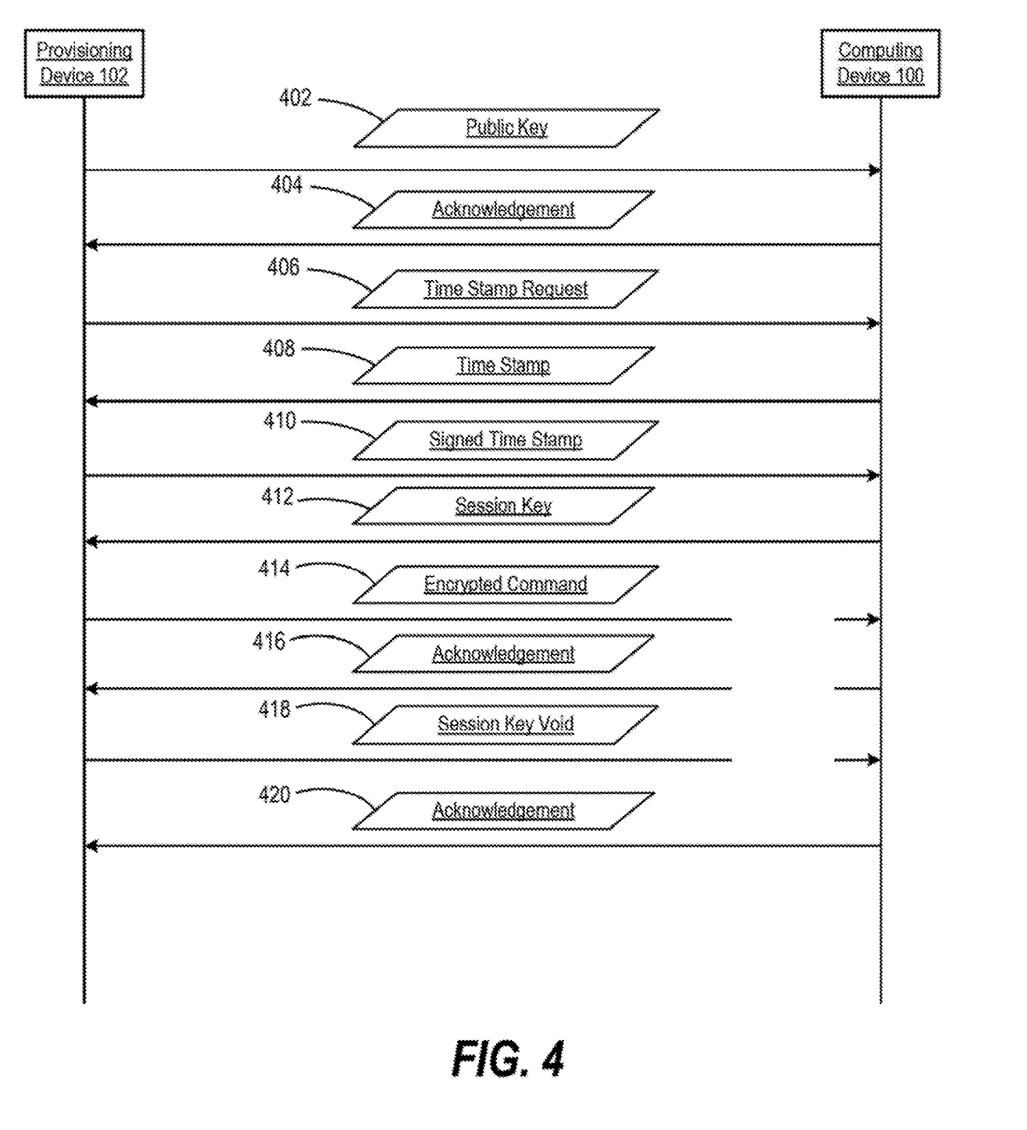
FIG. 4 illustrates an operation flow between a computing device and a provisioning device to manage a BIOS of the computing device, according to an example.

FIG. 4 illustrates an operation flow 400 between computing device 100 and provisioning device 102 to manage BIOS 114 of computing device 100, according to an example. Operation flow 400 may be implemented by various components of provisioning device 102 and computing device 100, such as processors 104 and 116, controllers 106 and 118, codecs 108 and 120, microphones 110 and 122, speakers 112 and 124, and BIOS 114. Provisioning device 102 may set a public key with computing device 100 by transmitting a public key 402 to computing device 100. Computing device 100 may use public key 402 for subsequent communication with provisioning device 102. In response to receiving public key 402, computing device 100 may transmit an acknowledgement 404 to provisioning device 102 to indicate the public key has been set. Transmission or insertion of public key 402 may be a one-time procedure to bind computing device 100 and provisioning device 102. The procedure may be performed in a secure environment. Provisioning device 102 may generate public key 402 and a private key. The use of the private key is described in more detail below.

To transmit a command to computing device 100, provisioning device 102 may transmit a time stamp request 406 to computing device 100. In response to receiving time stamp request 406, computing device 100 may generate a time stamp 408 and transmit time stamp 408 to provisioning device 102. In response to receiving time stamp 408, provisioning device 102 may generate a signed time stamp 410 by signing time stamp 408 with the private key stored in provisioning device 102. Provisioning device 102 may transmit signed time stamp 410 to computing device 100.

In response to receiving signed time stamp 410, computing device 100 may verify the source of signed time stamp 410 using public key 402. Computing device 100 may also determine if signed time stamp 410 is received within a threshold time range (e.g., 1 second from the time in signed time stamp 410). For example, computing device 100 may compare the time in signed time stamp 410 with a current system time in computing device 100. Verifying signed time stamp 410 is received within the threshold time range may reduce the likelihood of a man-in-the-middle attack.

In response to a determination that time in signed time stamp 410 is within the threshold time range, computing device 100 may generate a session key 412 and transmit session key 412 to provisioning device 102. Provisioning device 102 may encrypt a command using session key 412 and transmit an encrypted command 414 to computing device 100. Examples of encrypted command 414 may be first command 200, second command 202, and boot command 308.

In response to receiving encrypted command 414, computing device 100 may decrypt encrypted command 414 using session key 412 to generate a decrypted command. Computing device 100 may configure BIOS 114, as described in FIGS. 1-3, based on the decrypted command.

Computing device 100 may also transmit an acknowledgement 416 to provisioning device 102 to indicate encrypted command 414 has been received.

When provisioning device 102 is done transmitting commands to computing device 100, provisioning device 102 may void session key 412 and transmit a session key void message 418 to computing device 100. In response to receiving session key void message 418, computing device 100 may void session key 412 (e.g., by deleting session key 412). Computing device 100 may also transmit an acknowledgement 420 to provisioning device 102 to indicate that session key 412 has been voided.

Figure 5:
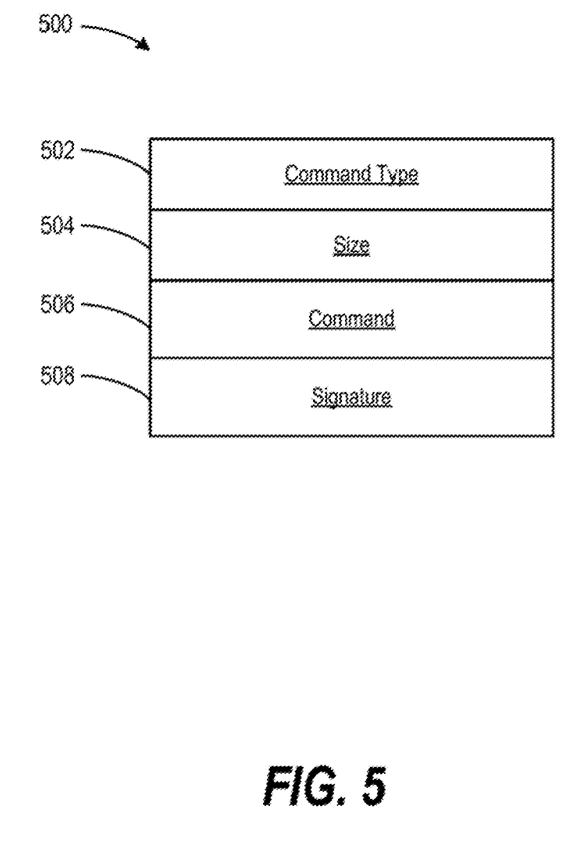
FIG. 5 illustrates a format of a command transmitted by provisioning device, according to an example.

FIG. 5 illustrates a format of a command 500 transmitted by provisioning device, according to an example. Command 500 may include a command type field 502, a size field 504, a command field 506, and a signature field 508.

Command type field 502 may indicate the command type of command 500. The command type may include a plain command, an encrypted command, and a signed command. A plain command may be a command that is not encrypted or signed, such as time stamp request 406 of FIG. 4. An encrypted command may be a command that is encrypted (e.g., encrypted command 414). A signed command may be a command that is signed digitally (e.g., signed time stamp 410).

Size field 504 may indicate the size of command 500. Command field 506 may identify what command 500 is. For example, "1" may identify that command 500 is a command to set the public key, "2" may identify that command 500 is a command to request a time stamp. "3" may identify that command 500 is a signed time stamp (e.g., signed time stamp 410), "4" may identify that command 500 is a command to back up BIOS data 204 (e.g., first command 200), "5" may identify that command 500 is a command to restore BIOS data 204 (e.g., second command 202), and "6" may identify that command 500 is a command a boot command (e.g., boot command 308), etc. Signature field 508 may be where a digital signature is embedded.

Figure 6:
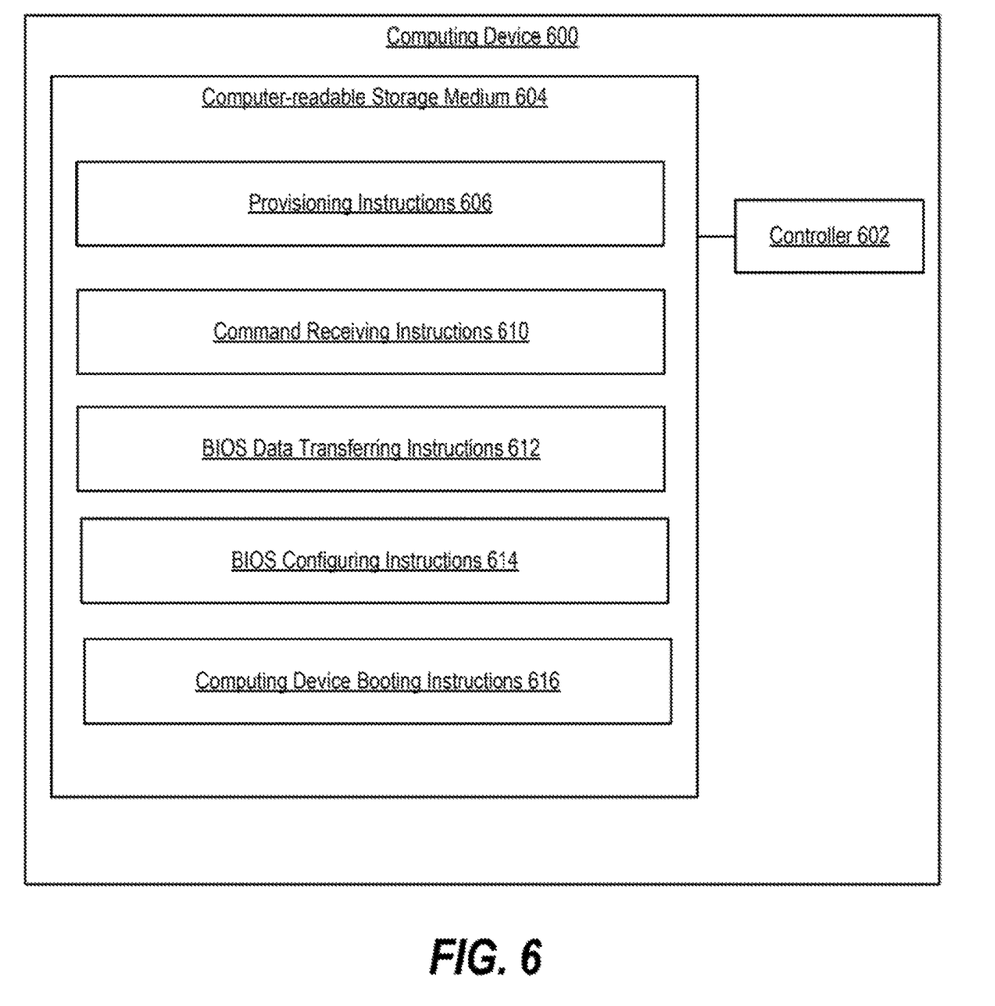
FIG. 6 illustrates a computing device to configure a BIOS and/or manage BIOS data based on a command from a provisioning device, according to an example.

FIG. 6 illustrates a computing device 600 to configure a BIOS and/or manage BIOS data based on a command from a provisioning device, according to an example. Computing device 600 may implement computing device 102 of FIGS. 1-4. Computing device 600 may include a controller 602 and a computer-readable storage medium 604.

Controller 602 may be a semiconductor-based microprocessor and/or other hardware devices suitable for retrieval and execution of instructions stored in computer-readable storage medium 604. Controller 602 may fetch, decode, and execute instructions 606, 608, 610, 612, 614, and 616 to control operations of computing device 600. As an alternative or in addition to retrieving and executing instructions, controller 602 may include at least one electronic circuit that includes electronic components for performing the functionality of instructions 606, 608, 610, 612, 614, 616, or a combination thereof.

Computer-readable storage medium 604 may be any electronic, magnetic, optical, or other physical storage device that contains or stores executable instructions. Thus, computer-readable storage medium 604 may be, for example, Random Access Memory (RAM), an Electrically Erasable Programmable Read-Only Memory (EEPROM), a storage device, an optical disc, etc. In some examples, storage medium 604 may be a non-transitory storage medium, where the term "non-transitory" does not encompass transitory propagating signals. Computer-readable storage medium 604 may be encoded with a series of processor executable instructions 606, 608, 610, 612, 614, and 616.

Provisioning instructions 606 may enable computing device 600 to receive commands from a provisioning device, such as provisioning device 102 of FIGS. 1-4. For example, referring to FIG. 4, computing device 100 may receive public key 402, transmit acknowledgements 404, 416, and 420, request time stamp request 406, transmit time stamp 408, receive signed time stamp 410, verify signed time stamp 410, transmit session key 412, transmit acknowledgement 416, receive session key void message 418, and void session key 412.

Command receiving instructions 610 may receive a command from the provisioning device. For example, referring to FIGS. 2-3, computing device 100 may receive first command 200, second command 202, and boot command 308. BIOS data transferring instructions 612 may back up BIOS data, recover BIOS data, or a combination thereof. For example, referring to FIG. 2, BIOS data transferring instructions 612 may generate BIOS data copy 208 from BIOS data 204 and store BIOS data copy 208 in controller 106. BIOS data transferring instructions 612 may replace BIOS data 204 using BIOS data copy 208.

BIOS configuring instructions 614 may configure a BIOS of computing device 600. For example, referring to FIG. 3, computing device 100 may configure BIOS 114 using BIOS profiles 300 and 302. Computing device booting instructions 616 may turn on computing device 600. For example, referring to FIG. 3, controller 106 may turn on computing device 100 in response to receiving boot command 308.

Figure 7:
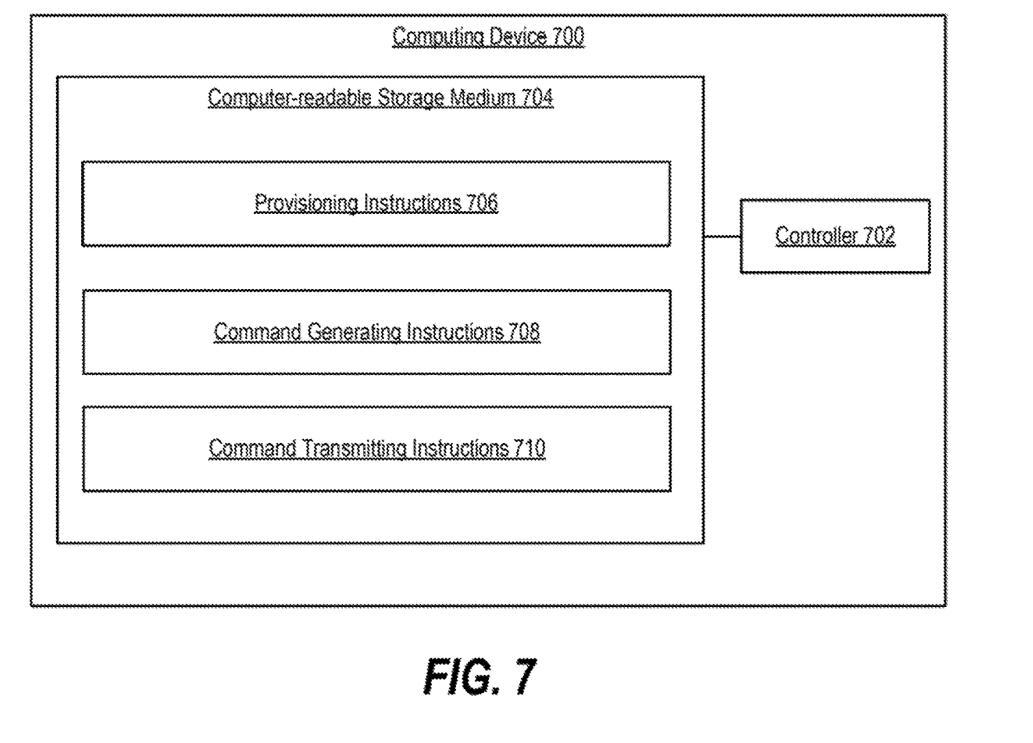
FIG. 7 illustrates a computing device to configure a BIOS and/or manage BIOS data of another computing device, according to an example.

FIG. 7 illustrates a computing device 700 to configure a BIOS and/or manage BIOS data of another computing device, according to an example. Computing device 700 may implement provisioning device 102 of FIGS. 1-4. Computing device 700 may include controller 702 and computer-readable storage medium 704. Controller 702 may be similar to controller 702 of FIG. 6 and computer-readable storage medium 704 may be similar to computer-readable storage medium 604.

Computer-readable storage medium 704 may be encoded with instructions 706, 708, and 710. Provisioning instructions 706 may enable computing device 700 to transmit a command to another computing device. For example, referring to FIG. 4, provisioning device 102 may set the public key with computing device 100 by transmitting public key 402 to computing device 100, transmit time stamp request 406 to computing device 100, sign time stamp 408 to generate signed time stamp 410, transmit signed time stamp 410 to computing device 100, transmit session key void message 418 to computing device 100, void session key 412, and receive acknowledgements 404, 416, and 420. Command generating instructions 708 may generate a command to be transmitted to the computing device. For example, referring to FIGS. 2-3, provisioning device 102 may generate first command 200, second command 202, and boot command 308. Command transmitting instructions 710 may transmit a command to the computing device. For example, referring to FIG. 4, provisioning device 102 may transmit first command 200, second command 202, and boot command 308 to computing device 100.

The use of "comprising", "including" or "having" are synonymous and variations thereof herein are meant to be inclusive or open-ended and do not exclude additional unrecited elements or method steps.

What is claimed is:

1. A computing device comprising:
   a non-volatile memory to store Basic Input/Output System (BIOS) data of the computing device;
   an audio codec to receive an audio signal, wherein the audio signal comprises a command; and
   a controller in communication with the non-volatile memory and the audio codec, wherein the controller is to:
     in response to receiving a time stamp request from a provisioning device at the audio codec, transmit a time stamp to the provisioning device;
     in response to receiving a signed time stamp from the provisioning device,
       verify the signed time stamp using a public key, and
       transmit a session key to the provisioning device;
     receive an encrypted version of the command from the provisioning device;
     decrypt, with the session key, the encrypted version of the command into the command; and
     in response to the command, transfer a copy of the BIOS data to the non-volatile memory as a replacement for the BIOS data stored in the non-volatile memory.

2. The computing device of claim 1, further comprising a microphone and a speaker, wherein the microphone and the speaker are connected to the audio codec.

3. The computing device of claim 1, wherein the controller is further to:
   in response to receiving a session key void message from the provisioning device, void the session key.

4. A computing device comprising:
   a Basic Input/Output System (BIOS), wherein the BIOS includes a first BIOS profile and a second BIOS profile; and
   a controller to:
     in response to receiving a time stamp request from a provisioning device, transmit a time stamp to the provisioning device;
     in response to receiving a signed time stamp from the provisioning device,
       verify the signed time stamp using a public key, and
       transmit a session key to the provisioning device;
     receive an encrypted command from the provisioning device, wherein the encrypted command comprises an acoustic signal, and wherein the acoustic signal comprises a boot command identifying the second BIOS profile;
     decrypt, with the session key, the encrypted command into the boot command; and
     in response to the boot command identifying the second BIOS profile:
       configure the BIOS using the second BIOS profile instead of the first BIOS profile; and
       turn on the computing device.

5. The computing device of claim 4, wherein the boot command includes a power up command and a profile identifier.

6. The computing device of claim 5, wherein the second BIOS profile is associated with the profile identifier.

7. The computing device of claim 4, wherein the second BIOS profile is different from the first BIOS profile.

8. The computing device of claim 7, further comprising a power button, wherein the controller further is to configure the BIOS with the first BIOS profile when the computing device is turned on via the power button.

9. The computing device of claim 4, further comprising an audio codec and a microphone to receive the acoustic signal.

10. A non-transitory computer-readable storage medium storing instructions that, when executed by a controller of a computing device, cause the controller to:

in response to receiving a time stamp request from a provisioning device, transmit a time stamp to the provisioning device;
in response to receiving a signed time stamp from the provisioning device,
verify the signed time stamp using a public key, and transmit a session key to the provisioning device;
receive a first power up command from a power up button of the computing device;
in response to receiving the first power up command, configure a Basic Input/Output System (BIOS) of the computing device based on a first BIOS profile;
receive an encrypted boot command from the provisioning device via a wireless channel, wherein the encrypted boot command includes a second power up command and a profile identifier for a second BIOS profile;
decrypt, with the session key, the encrypted boot command into a boot command; and
in response to the boot command, configure the BIOS based on the second BIOS profile instead of the first BIOS profile.

11. The non-transitory computer-readable storage medium of claim 10, wherein the first BIOS profile indicates that a setting of the BIOS is enabled, and wherein the second BIOS profile indicates that the setting is disabled.

12. The non-transitory computer-readable storage medium of claim 10 storing further instructions that, when executed by the controller, cause the controller to:
manage BIOS data of the computing device in response to a command received from the provisioning device.

* * * * *